United States Patent [19]

Sato

[11] Patent Number: 5,219,422
[45] Date of Patent: Jun. 15, 1993

[54] WASHER PUMP PROVIDED WITH MEANS FOR DETERMINING WHEN THE LEVEL OF WASHER FLUID IS LOW

[75] Inventor: Toshihiro Sato, Toyohashi, Japan

[73] Assignee: ASMO Co., Ltd., Kosai, Japan

[21] Appl. No.: 801,045

[22] Filed: Dec. 3, 1991

[30] Foreign Application Priority Data

Dec. 26, 1990 [JP] Japan .................................. 2-406567

[51] Int. Cl.⁵ .............................................. B67D 5/40
[52] U.S. Cl. ..................................... 222/282; 222/385; 222/377
[58] Field of Search .................... 222/23, 40, 282, 376, 222/385, 383, 377, 481, 547, 382

[56] References Cited

U.S. PATENT DOCUMENTS

| 1,976,902 | 10/1934 | Stoddard | 222/376 X |
| 2,306,310 | 12/1942 | Curtis | 222/385 |
| 3,055,304 | 9/1962 | Ziegler | 222/385 X |
| 3,390,698 | 7/1968 | Carmichael et al. | 222/385 X |
| 3,915,351 | 10/1975 | Kiralfy | 222/385 |
| 4,173,222 | 11/1979 | Muetterties | 222/481 X |
| 4,260,340 | 4/1981 | Lamaudiere | 222/385 X |

FOREIGN PATENT DOCUMENTS

| 732705 | 9/1932 | France | 222/385 |
| 811687 | 4/1937 | France | 222/385 |
| 56-87959 | 7/1981 | Japan . | |
| 62-92427 | 6/1987 | Japan . | |
| 1260762 | 1/1972 | United Kingdom . | |
| 1378331 | 12/1974 | United Kingdom . | |
| 1592288 | 7/1981 | United Kingdom . | |

Primary Examiner—Andres Kashnikow
Assistant Examiner—Kenneth Bomberg
Attorney, Agent, or Firm—Burns, Doane, Swecker & Mathis

[57] ABSTRACT

A washer pump for sending, to a nozzle under pressure, cleaning liquid introduced thereinto from an inlet thereof provided in the interior of a washer tank and discharged from an outlet thereof is designed to allow an individual to determine the level of cleaning liquid in the washer tank. The washer pump includes: a cylindrical peripheral wall formed by extending the peripheral wall of the inlet upward so that the upper end of the cylindrical peripheral wall serves as the opening thereof; and a flow passage serving as a through-hole provided on the cylindrical peripheral wall at a lower portion thereof. Preferably, the through-hole is provided on the cylindrical peripheral wall such that the height of the through-hole is almost the same as that of the inlet or below the inlet. The through-hole may consist of a groove vertically extending in the direction from the upper end of the cylindrical peripheral wall toward a lower portion thereof. Thus, the interior of the washer tank communicates with the interior surrounded with the cylindrical peripheral wall.

20 Claims, 8 Drawing Sheets

Fig. 8 - PRIOR ART
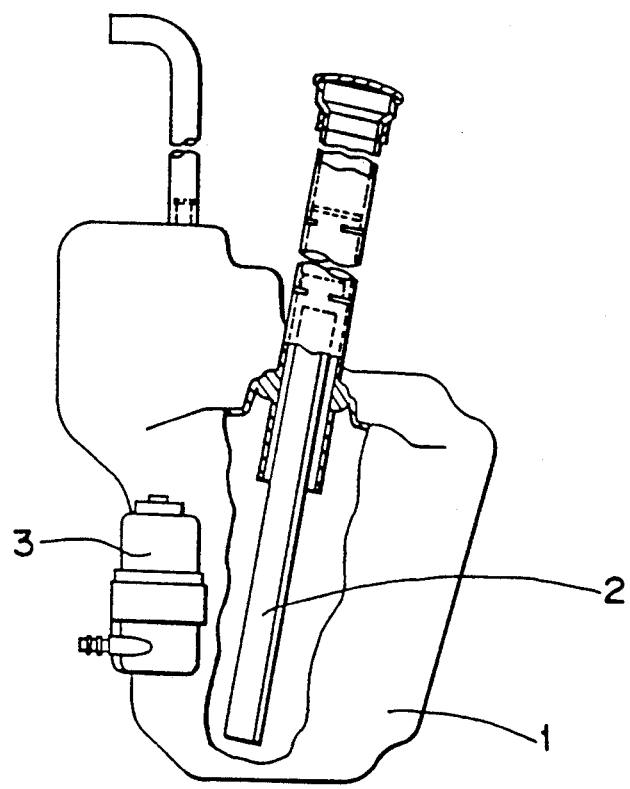
Fig. 9 - PRIOR ART
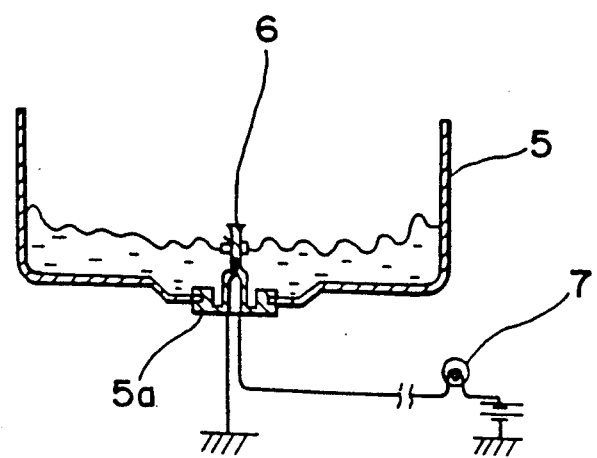

WASHER PUMP PROVIDED WITH MEANS FOR DETERMINING WHEN THE LEVEL OF WASHER FLUID IS LOW

BACKGROUND OF THE INVENTION

1. Field of the Invention

The present invention relates to a washer pump and more particularly to a washer pump of a simple construction which allows a driver to easily and reliably check the amount of cleaning liquid stored in a washer tank of an automobile.

2. Description of the Related art

Conventionally, in order check the amount of cleaning liquid stored in a washer tank and used by a window washer of a vehicle such as an automobile, a float 2 is placed in a washer tank 1 in order for a driver to examine the position of the float 2, as shown in FIG. 8.

However, according to the above-described construction, it is necessary to open the bonnet of an engine room provided with the washer tank 1 so as to check the position of the float. If a driver has not examined the position of the float 2 even through the amount of the cleaning liquid is very small, it will eventually happen that cleaning liquid is not supplied to the windshield even though the washer pump 3 operates.

In order to solve the above-described problem, examined Japanese Utility Model Publication No. 62-92427 discloses an apparatus as shown in FIG. 9. According to the apparatus, a level warning switch 6 which generates an electric signal upon detection of the amount of cleaning liquid is fixedly inserted into an opening 5a formed in a washer tank 5, and a warning lamp 7 which is turned on according to the electric signal generated by the switch 6 is provided in the vicinity of the driver's seat.

According to the above apparatus, the warning lamp 7 is turned on when the amount of cleaning liquid is less than a predetermined amount. Thus, the driver is informed that the amount of the cleaning liquid is small and can replenish the washer tank 5 with cleaning liquid without having to observe the cleaning liquid in the washer tank 5. That is, even though the driver has failed to check the amount of cleaning liquid, the situation does not arise in which cleaning liquid is not supplied to the windshield by the operation of the washer pump.

However, it is necessary to provide the apparatus with the switch 6, the warning lamp 7, and a wire harness for electrically connecting the switch 6 and the warning lamp 7 with each other. Consequently, the apparatus is complicated in its construction and is expensive.

Instead of the above-described means for electrically detecting the amount of cleaning liquid, Japanese Utility Model Laid-Open Publication No. 56-87959 discloses the following apparatus for automatically informing a driver of the reduction of cleaning liquid. The apparatus comprises a sub-tank having a large opening in an upper portion thereof and a small opening in a lower portion thereof connected with a pipe of a washer pump. According to this apparatus, when the amount of cleaning liquid in the washer tank has become small, the cleaning liquid is supplied to the sub-tank from only the lower opening. In this case, the cleaning liquid is intermittently jetted on the windshield. Thus, the driver can find that the amount of the cleaning liquid has become small.

However, it is necessary to fix the sub-tank to the bottom surface of the washer tank. As such, the washer tank needs to have a configuration suitable for accommodating the sub-tank and it takes time to mount the sub-tank in the washer tank. In addition, it is necessary to connect the sub-tank with the pipe of the washer pump, which takes time and labor and increases the number of parts.

SUMMARY OF THE INVENTION

It is therefore an object of the present invention to provide a washer pump of a very simple construction in which cleaning liquid is supplied to a windshield in a small amount when the amount of the cleaning liquid in a washer tank has become small so that a driver is made aware of the reduction of the amount of cleaning liquid which remains in the washer tank.

In accomplishing these and other objects, there is provided a washer pump for sending, to a nozzle under pressure, cleaning liquid introduced thereinto from an inlet thereof provided in the interior of a washer tank and discharged from an outlet thereof comprising: a cylindrical peripheral wall formed to have a required length by extending the peripheral wall of the inlet upward so that the upper end of the cylindrical peripheral wall serves as the opening thereof; and a flow passage provided at a lower portion of the cylindrical peripheral wall so that the interior of the washer tank communicates with the interior surrounded with the cylindrical peripheral wall.

More specifically, the area of the flow passage is greater than that of the intake portion of the inlet when the level of the cleaning liquid is normal and the area of the flow passage is smaller than that area of the intake portion of the inlet when the level of said cleaning liquid is low.

The flow passage may consist of a groove vertically extending in the direction from the upper end of the cylindrical peripheral wall toward a lower portion thereof. The configuration of the groove is linear or V-shaped.

According to the above construction, when the level of the cleaning liquid in the washer tank is greater than that of the opening of the cylindrical peripheral wall, the cleaning liquid flows from the opening and the flow passage into the interior surrounded with the cylindrical peripheral wall by the operation of the pump. Thus, the cleaning liquid is supplied to the inlet in a sufficient amount.

When the level of the cleaning liquid is lower than that of the opening, the cleaning liquid flows from only the flow passage into the interior surrounded with the cylindrical peripheral wall by the operation of the pump. That is, the cleaning liquid is supplied to the inlet in a reduced amount. Therefore, the cleaning liquid is sent under pressure to the washer nozzle in a smaller amount. A driver is made aware of reduction of the amount of the cleaning liquid in the washer tank by observing decrease in the amount of cleaning liquid being jetted onto the windshield.

When the operation of the pump is stopped in the event that the level of the cleaning liquid is lower than the height of the opening, the cleaning liquid which has flowed from the flow passage accumulates in the interior surrounded with the cylindrical peripheral wall. When the pump starts its operation thereafter, the cleaning liquid is sent under pressure to the nozzle in an increased amount. The driver can check the reduction of the cleaning liquid in the washer tank by observing the increased amount of the cleaning liquid.

Further, the construction of the washer pump is simple and it does not take much time and labor to form the peripheral wall and the flow passage on the washer pump and the provision of a large number of parts is not required in that the peripheral wall is integrated with the peripheral wall of the inlet and the flow passage is provided on the peripheral wall. Therefore, it is unnecessary to manufacture the washer tank in conformity with the configuration of the washer tank.

BRIEF DESCRIPTION OF THE INVENTION

These and other objects and features of the present invention will become apparent from the following description taken in conjunction with preferred embodiments thereof with reference to the accompanying drawings, throughout which like parts are designated by like reference numerals, and in which:

FIG. 8 is a schematic view showing a means for detecting the amount of cleaning liquid which remains in a conventional washer tank; and FIG. 9 is a schematic view showing an another means for detecting the amount of cleaning liquid which remains in a conventional washer tank.

DETAILED DESCRIPTION OF THE INVENTION

Figure 1:
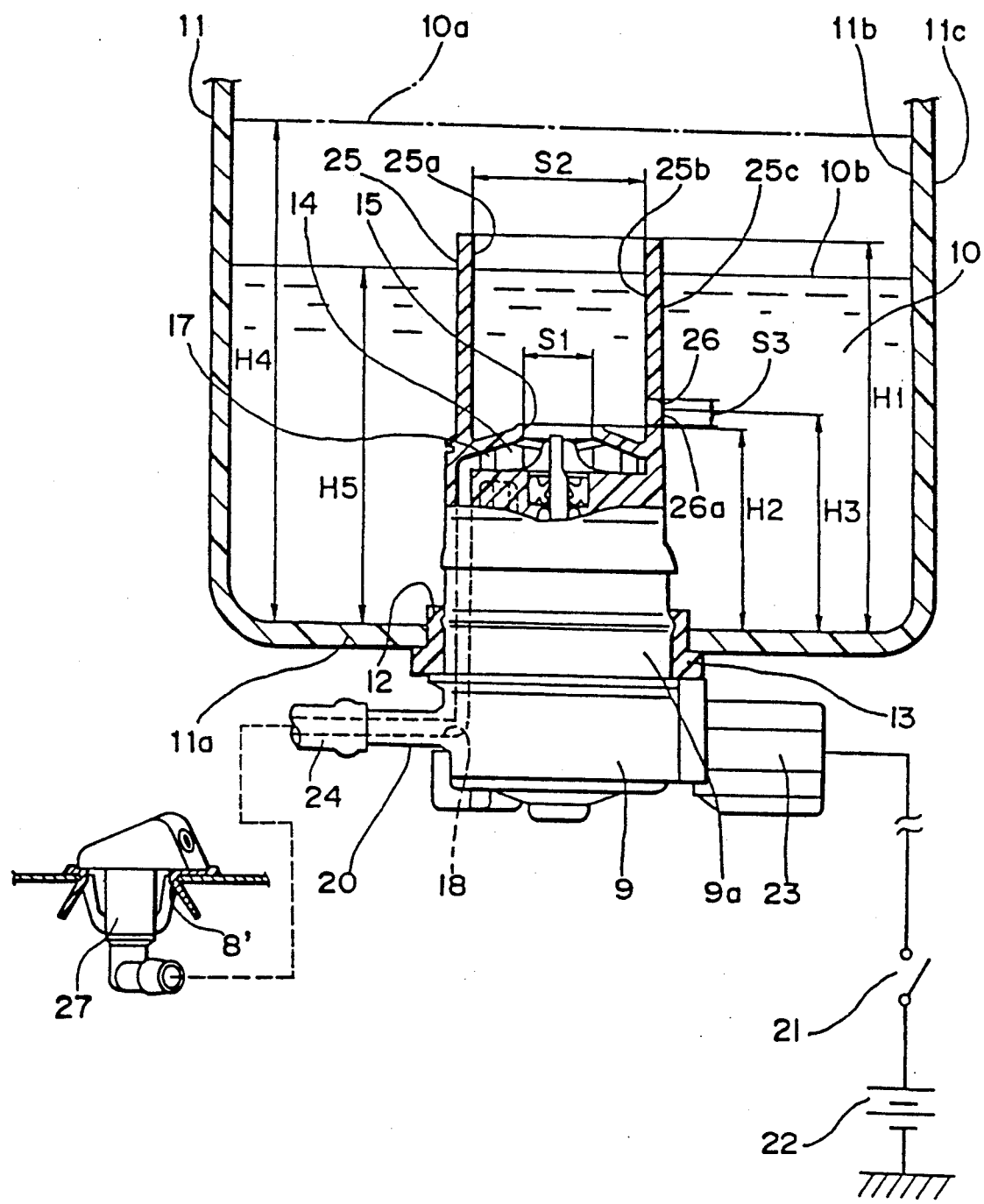
FIG. 1 is a sectional view showing principal portions of a washer pump according to a first embodiment of the present invention.

Before the description of the present invention proceeds, it is to be noted that like parts are designated by like reference numerals throughout the accompanying drawings.

Referring to FIG. 1 showing a washer pump 9 according to a first embodiment of the present invention is described below. The upper portion of an outer diameter portion 9a of the pump main body is fixedly inserted into an opening 12, through a grommet 13, formed on a bottom 11a of a washer tank 11 which stores cleaning liquid 10.

The pump 9 comprises an impeller 14 driven by a motor (not shown) and a pumping section 17 for introducing cleaning liquid 10 thereinto from the intake portion of an inlet 15, the area of which is S1.

The pump 9 further comprises an outlet 20, communicating with the pumping section 17 via a duct 18 and provided on a peripheral surface 11c of the tank 11, for discharging cleaning liquid introduced thereinto by the pumping section 17. The outlet 20 is connected with a pipe 24 communicating with a nozzle (not shown) for supplying cleaning liquid to a windshield not shown. The tank 11 comprises a terminal 23, provided in a peripheral portion thereof, for supplying electric power for operating the pump 9. The terminal 23 is connected with the power source 22 via a switch 21 provided in the vicinity of a driver's seat.

In the pump 9, a cylindrical peripheral wall 25 is formed by extending the peripheral wall of the inlet 15 upward. The height of the peripheral wall 25 is H1. The casing of the pump 9 comprising the peripheral wall of the inlet 15 and the peripheral wall 25 which are integral with are rather is made of resin.

The area S2 of an opening 25a positioned on the upper end of the peripheral wall 25 is equal to or more than the area S1 of the intake portion of the inlet 15, namely, $S1 \leq S2$.

A through-hole 26 is provided on the peripheral wall 25 so that an interior 25b surrounded with the peripheral wall 25 communicates with an exterior 25c of the peripheral wall 25. Thus, the through-hole 26 serves as a flow passage of the cleaning liquid between the interior 25b and the exterior 25c. The height H3 of the through-hole 26 is a little greater than the height H2 of the inlet 15. The area of the opening 26a of the through-hole 26 is S3 which is less than the area S1 of the intake portion of the inlet 15, namely, $S1 \geq S3$. That is, the sum of the area S2 of the opening 25a of the peripheral wall 25 and the area S3 of the through-hole 26 is equal to or more than the area S1 of the intake portion of the inlet 15, namely, $S1 \leq S2 + S3$.

The operation of the pump 9 of the first embodiment of the above construction is described below.

When the switch 21 is turned on, the motor of the pump 9 is driven to rotate the impeller 14. As a result, the cleaning liquid 10 in the tank 11 is taken into the pumping section 17 through the inlet 15 and discharged from the outlet 20 via the duct 18, then, sent to the nozzle via the pipe 24 under pressure, and then, to the windshield.

In the normal condition, i.e., when a sufficient amount of cleaning liquid 10 is stored in the tank 11, i.e., when the height H4 of the level 10a of the cleaning liquid 10 is greater than the height H1 of the peripheral wall 25, the cleaning liquid 10 flows into the interior 25b through the opening 25a and the through-hole 26 upon turn-on of the switch 21. Thus, the cleaning liquid 10 is supplied to the inlet 15.

As described above, the relationship between the area S1 of the intake portion of the inlet 15, the area S2 of the opening 25a, and the area S3 of the through-hole 26 is $S1 \leq S2 + S3$. Therefore, a sufficient amount of the cleaning liquid 10 can be supplied to the interior 25b. That is, a sufficient amount of the cleaning liquid 10 can be supplied from the nozzle to the windshield during ON of the switch 21.

When the amount of the cleaning liquid 10 in the tank 11 has become very small, i.e., when the height H5 of the level 10b of the cleaning liquid 10 is smaller than the height H1 of the peripheral wall 25, both the cleaning liquid 10 stored in the interior 25b and that which has flowed into the interior 25b through the through-hole 26 are supplied to the inlet 15.

As described above, the area S3 of the through-hole 26 is equal to or smaller than the area S1 of the intake portion of the inlet 15, namely, $S1 \geq S3$. Therefore, when the amount of the cleaning liquid 10 reserved in the interior 25b is exhausted, the cleaning liquid 10 is supplied from only the through-hole 26 to the inlet 15.

When the cleaning liquid 10 is supplied from only the through-hole 26 to the inlet 15, the amount of cleaning liquid 10 supplied to the inlet 15 is smaller than the amount of cleaning liquid 10 discharged from the outlet 20, with the result that the amount of cleaning liquid supplied from the nozzle to the windshield in this condition becomes smaller compared with the above-described normal condition in which the height H4 of the level 10a of the cleaning liquid 10 is greater than the height H1 of the peripheral wall 25. Finally, the cleaning liquid 10 is not supplied any more to the windshield even if the operation for supplying the cleaning liquid 10 to the windshield continues.

Accordingly, a driver can determine that the amount of the cleaning liquid 10 has been reduced by observing the amount of the cleaning liquid 10 supplied to the windshield. Thus, driver can recognize that it is necessary to replenish the tank with cleaning liquid 10.

When the switch 21 is turned off while the cleaning liquid 10 is being supplied from the through-hole 26 to the interior 25b, the cleaning liquid 10 flows into the interior 25b via the through-hole 26. Thus, the cleaning liquid 10 accumulates in the interior 25b. When the switch 21 is then turned on, the cleaning liquid 10 is supplied from the exterior 25c to the interior 25b through the through-hole 26. Therefore, the cleaning liquid 10 is normally supplied to the nozzle.

Accordingly, the driver can recognize that the amount of cleaning liquid 10 has become small by observing the change of the cleaning liquid 10, namely, by observing that the amount cleaning liquid 10 is supplied to the windshield in a reduced amount and then, in a normal amount upon turn-on of the switch 21.

The provision of the pump 9 eliminates the need for opening the bonnet so as to observe the amount of cleaning liquid 10 in the tank 11. The driver can recognize that the amount of cleaning liquid 10 being supplied to the windshield has reduced by finding the change of the amount of the cleaning liquid 10 as described above.

Further, in the pump 9, the peripheral wall 25 is formed as an upward extension of the peripheral wall of the inlet 15. Therefore, even when the cleaning liquid 10 in the tank 11 is shaken while the automobile is traveling on a gravel road, the peripheral wall 25 is capable of preventing the cleaning liquid 10 from being shaken greatly in the periphery of the inlet 15. Thus, even when the cleaning liquid 10 is shaken to a great extent, the pumping section 17 is not idled. Therefore, it does not happen that the cleaning liquid 10 is not accidentally supplied to the windshield.

In addition, in the pump 9, the amount of cleaning liquid 10 to be supplied to the windshield per operation of the window washer can be appropriately set by setting the volume of the cleaning liquid 10 in the interior 25b. Accordingly, the cleaning liquid in the tank 11 can be efficiently used.

Figure 2:
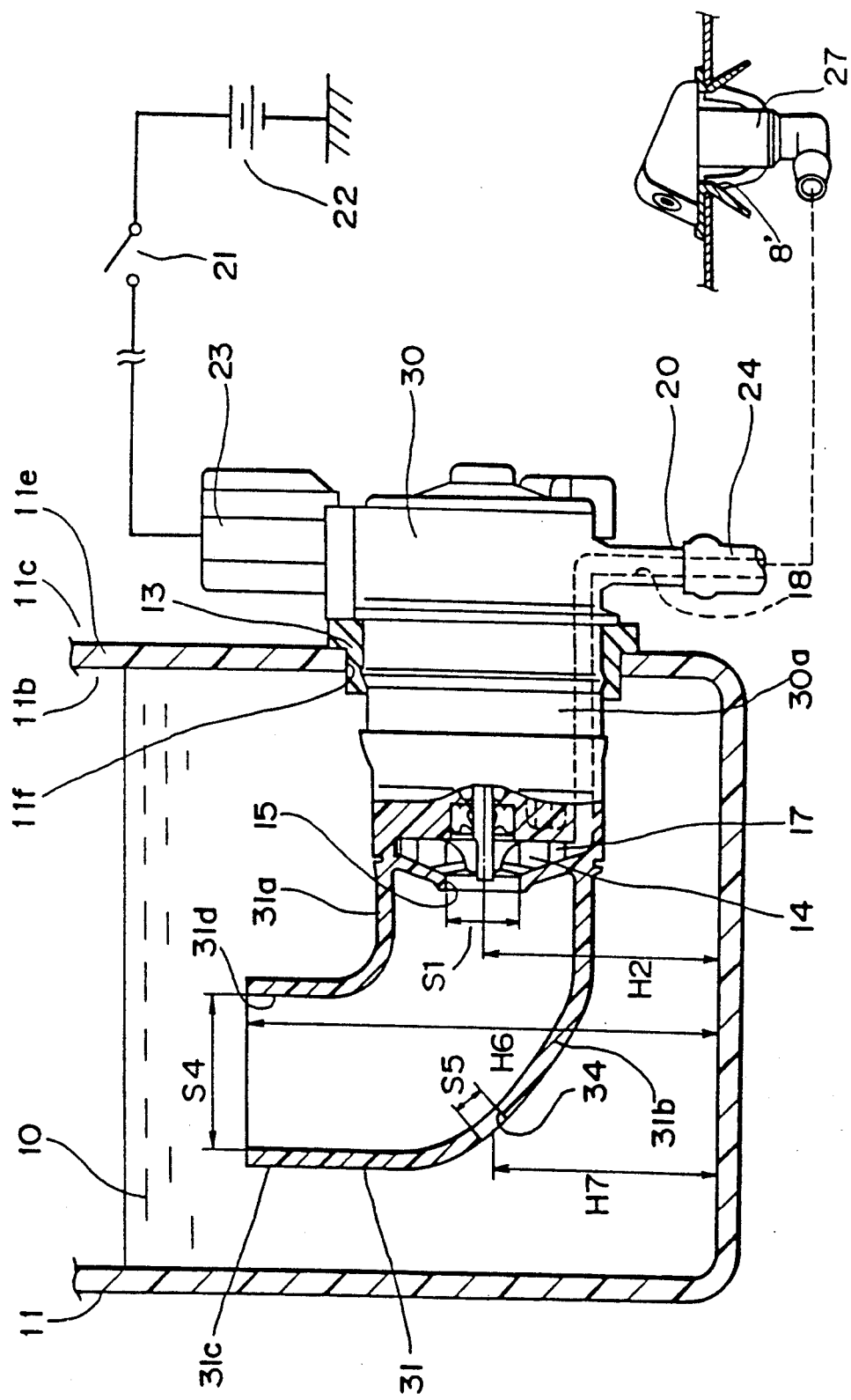
FIG. 2 is a sectional view showing principal portions of a washer pump according to a second embodiment of the present invention.

Referring to FIG. 2, a washer pump according to a second embodiment of the present invention is described below. A washer pump 30 is mounted on an opening 11f formed on a peripheral surface 11e of the tank 11. A cylindrical peripheral wall 31 comprises a first section 31a extending horizontally from the peripheral wall of the inlet 15 and a second section 31c formed upward in integration with a curved section 31b which is integrated with the first section 31a. An opening 31d is formed on the upper end of the second section 31c.

Similar to the first embodiment, the opening 31d of the peripheral wall 31 is positioned above the inlet 15 and the height thereof is H6. The area S4 of the opening 31d is equal to or greater than the area S1 of the inlet 15, namely, $S1 \leq S4$.

According to the second embodiment, a through-hole 34 serving as a flow passage communicating the interior of the peripheral wall 31 with that of the tank 11 is formed on the peripheral wall 31. The height H7 of the through-hole 34 is almost the same as the height H2 of the inlet 15 of the curved section 31b. Similar to the first embodiment, the area S5 of the through-hole 34 is equal to or smaller than the area S1 of the intake portion of the inlet 15, namely, $S1 \geq S5$.

Since the construction and operation of the second embodiment are similar to those of the first embodiment, the description thereof is omitted.

Figure 3:
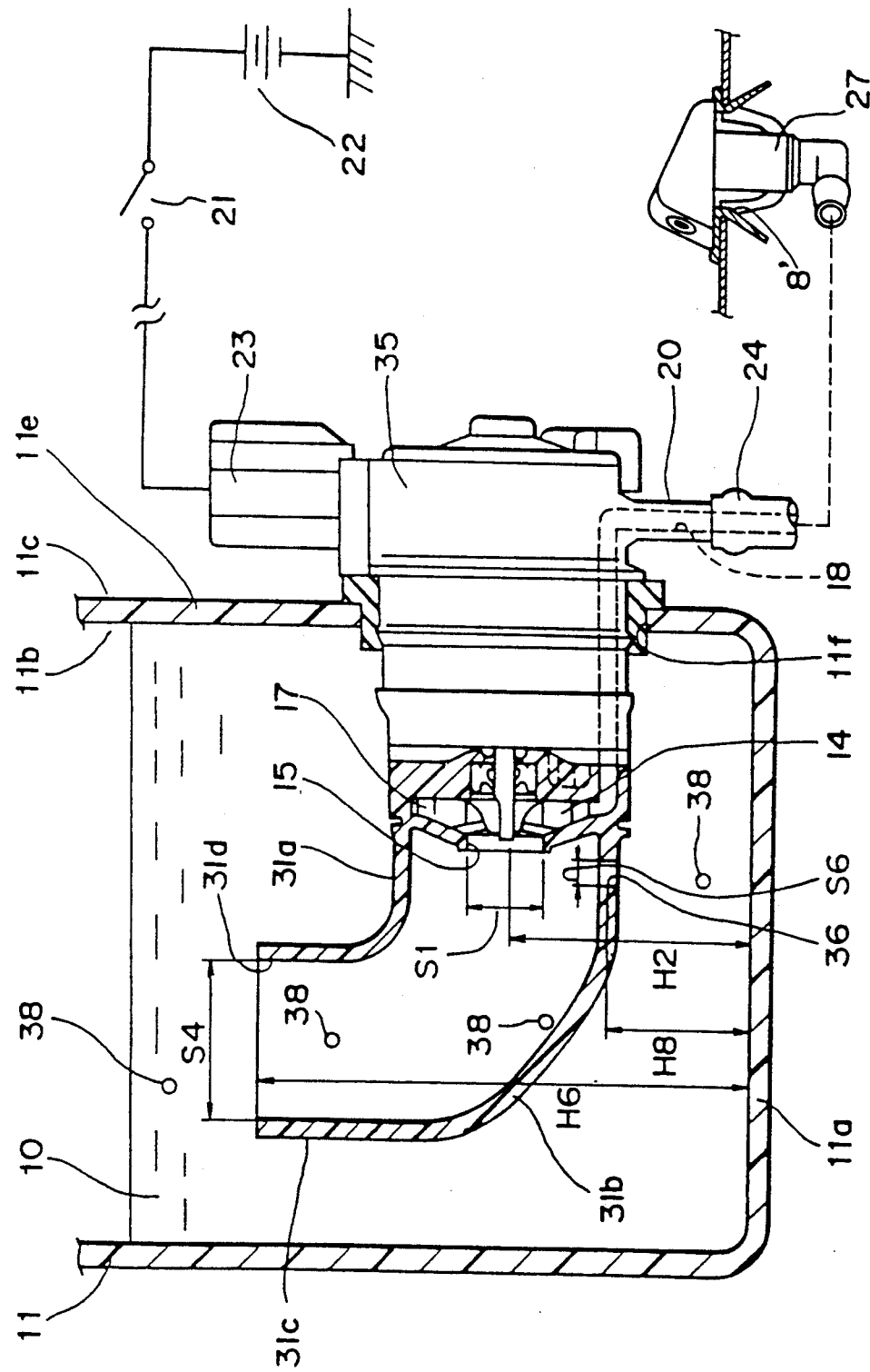
FIG. 3 is a sectional view showing principal portions of a washer pump according to a third embodiment of the present invention.

Referring to FIG. 3, a washer pump according to a third embodiment of the present invention is described below. A washer pump 35 according to the third embodiment is fundamentally the same as that of the second embodiment. A through-hole 36 is formed on a peripheral wall 31 of the pump 35 in opposition to a bottom 11a of the tank 11. The height of the through-hole 36 is H8 which is lower than the height H2 of the inlet 15.

According to the third embodiment, the through-hole 36 formed at the above-described position allows foreign matter 38 which has flowed from the opening 31d into the interior of the peripheral wall 31 through the cleaning liquid 10 stored in the tank 11 to be discharged from the through-hole 36 to the tank 11. Therefore, the foreign matter 38 does not flow to the pumping section 17, so that the impeller 14 is not damaged or the liquid flow does not stagnate because the foreign matter 38 is not sent to the nozzle.

Figure 4:
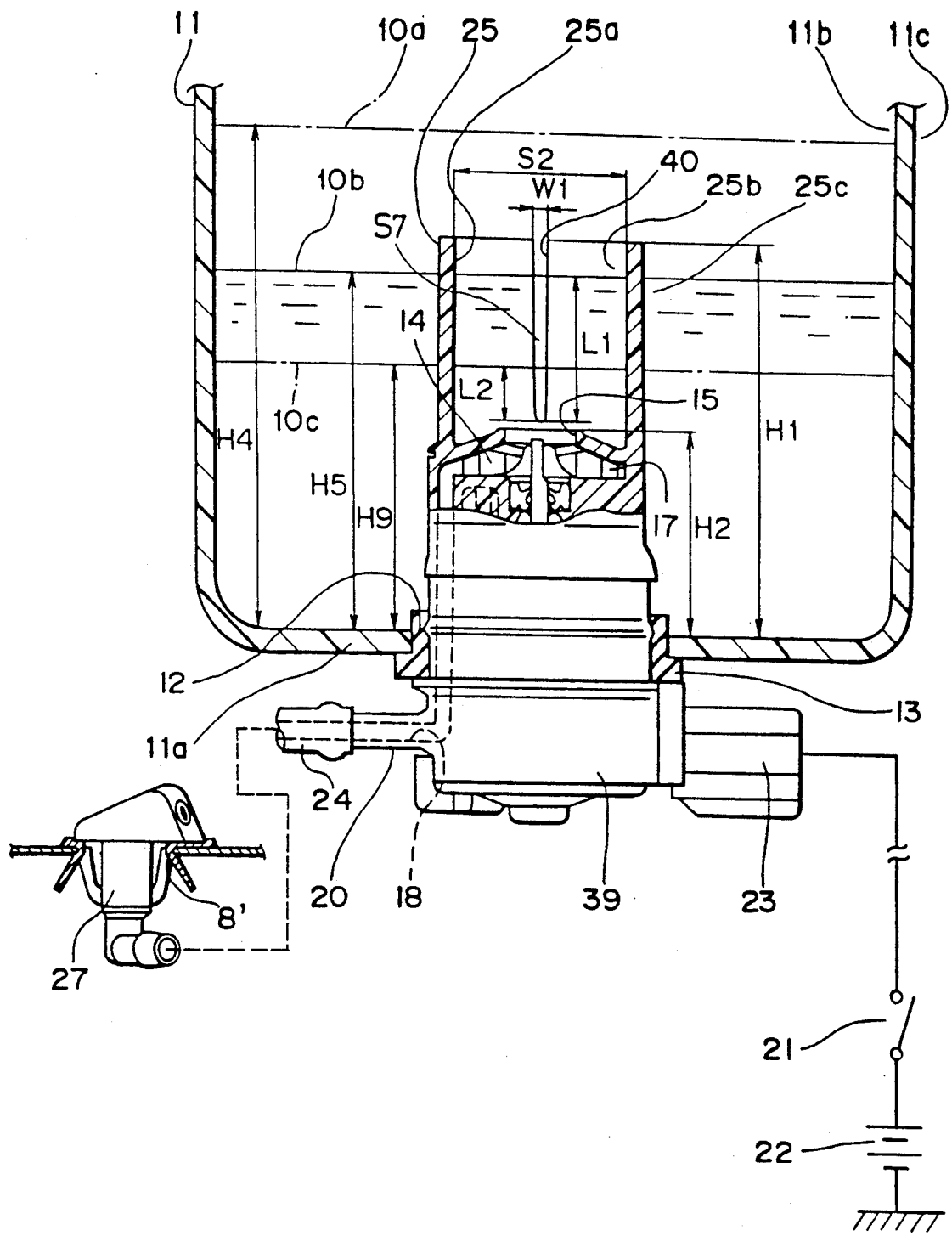
FIG. 4 is a sectional view showing principal portions of a washer pump according to a fourth embodiment of the present invention.

Referring to FIG. 4, a washer pump according to a fourth embodiment of the present invention is described below. In order to communicate the interior surrounded with a cylindrical peripheral wall 25 of a pump 39 and a tank 11 with each other, there is provided a linear groove 40 extending from an opening 25a positioned on the upper end of the peripheral wall 25 to a lower portion thereof. The area S7 of the groove 40 is set to be equal to or smaller than the area S1 of the intake portion of the inlet 15, namely, $S1 \leq S7$, similarly to the through-hole of the above-described embodiments.

According to the fourth embodiment, when the level of the cleaning liquid 10 is 10a (height: H4), upon actuation of the pump 25b surrounded with the peripheral wall 25 through the opening 25a and the groove 40 similarly to the above-described embodiments. Therefore, a sufficient amount of the cleaning liquid 10 is supplied to the inlet 15.

When the level of the cleaning liquid 10 is lower than the height H1 of the peripheral wall 25, upon actuation of the pump 39, the flow speed of the cleaning liquid 10 which flows into the interior of the peripheral wall 25 through the groove 40 is varied depending on the height of the level of the cleaning liquid 10.

For example, a comparison is made between the case in which the level of the cleaning liquid 10 is at level 10b (height: H5) and the case in which the level of the cleaning liquid 10 is at level 10c (height: H9). When the level is 10b, the cleaning liquid 10 flows from the area corresponding to a length L1 of the groove 40 into the interior of the peripheral wall 25 through the groove 40 upon actuation of the pump 39. When the level is 10c, the cleaning liquid 10 flows thereinto from the area corresponding to a length L2 of the groove 40 through the groove 40 upon actuation of the pump 39. The flow area of the cleaning liquid 10 in the latter case is smaller than that in the former case. That is, according to the pump 39 of the fourth embodiment, the smaller the level of the cleaning liquid 10, the smaller the flow area thereof into the interior 25b. Consequently, the flow speed of the cleaning liquid 10 into the interior 25b becomes slow and the amount of cleaning liquid 10 supplied to the windshield decreases.

Since the construction and operation of the fourth embodiment are similar to those of the first embodiment, the description thereof is omitted.

Figure 5:
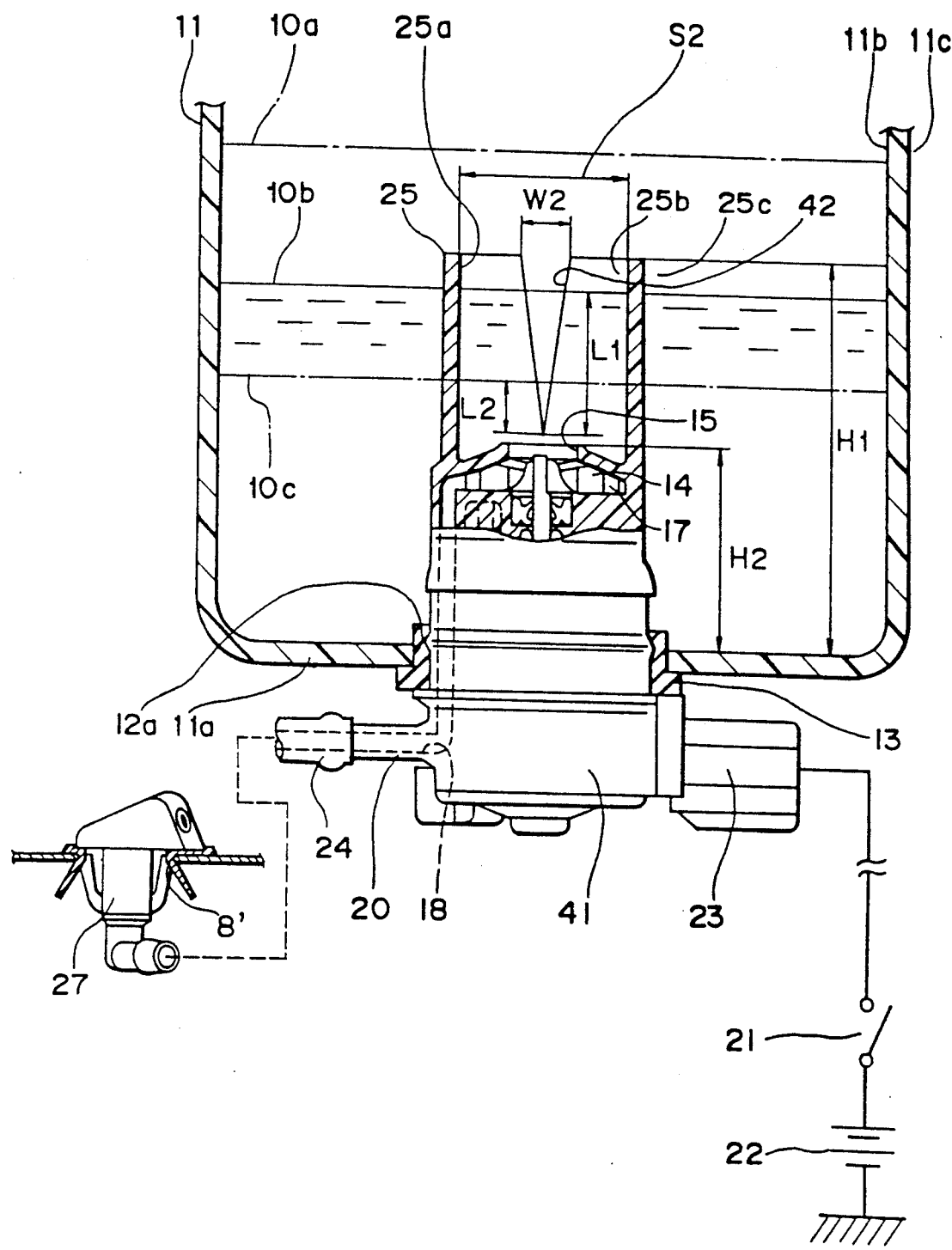
FIG. 5 is a sectional view showing principal portions of a washer pump according to a fifth embodiment of the present invention.

Referring to FIG. 5, a washer pump according to a fifth embodiment of the present invention is described below.

As shown in FIG. 5, a washer 41 comprises a V-shaped groove 42, serving as a flow passage, tapered to the lower end thereof. The groove 42 is similar to the groove 40 of the fourth embodiment in that the groove 40 and the groove 42 extend downward from the opening of the cylindrical peripheral wall 25. The maximum width of the groove 42 positioned on the upper end of the cylindrical peripheral wall 25 is W2. Accordingly, when the height of the cleaning liquid is smaller than the height H1 of the cylindrical peripheral wall 25, the cleaning liquid 10 flowing from the groove 42 into the interior 25b becomes slow with a reduced height of the cleaning liquid 10. The change in the flow speed of the cleaning liquid 10 in the fifth embodiment is greater than that in the flow speed of the cleaning liquid 10 in the fourth embodiment due to the change in the level of the cleaning liquid 10. This is because the groove 42 is V-shaped in the fifth embodiment whereas the groove 40 is linear in the fourth embodiment.

For example, in the fourth embodiment, the cleaning liquid 10 flows into the interior 25b in a reduced amount by the area of a rectangle of $(L1-L2) \times W1$ with the change in the level of the cleaning liquid 10 from 10b to 10c while in the fifth embodiment, the cleaning liquid 10 flows thereinto in a reduced amount by the area of a trapezoid, the height of which is $(L1-L2)$ with the change in the level of the cleaning liquid 10 from 10b to 10c. Therefore, compared with the fourth embodiment, the change in the flow speed of the cleaning liquid is larger in the fifth embodiment.

Figure 6:
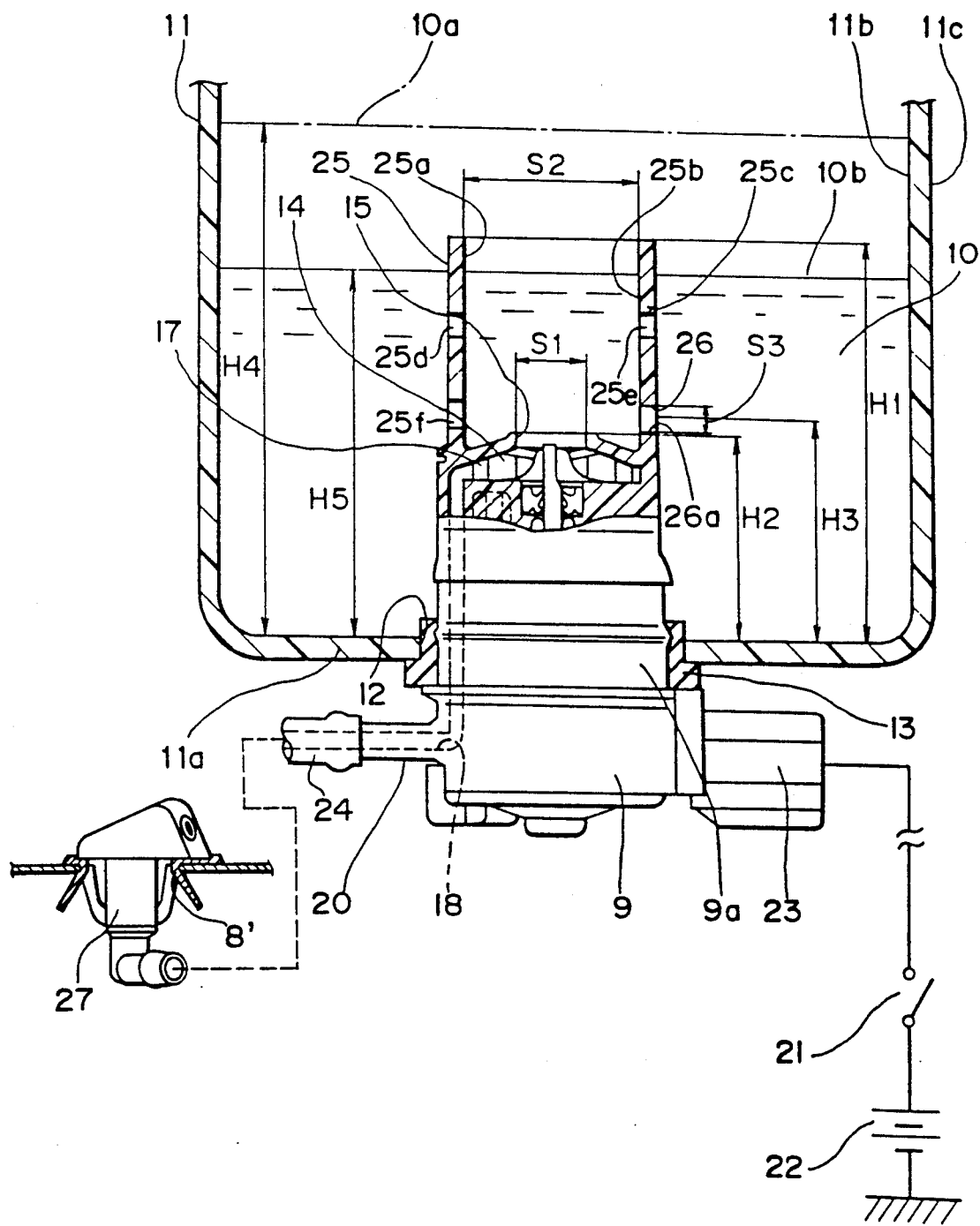
FIG. 6 is a sectional view showing principal portions of a washer pump according to a sixth embodiment of the present invention.

In the sixth embodiment, along the cylindrical, peripheral wall there are provided a plurality of through-holes 25d, 25e, 25f that allow the communication between the interior of said washer tank with the interior surrounded by said cylindrical peripheral wall, as like as a slit having a reversed V-shape, as shown in FIG. 6, to thereby reduce the amount of washing liquid flowing from the through-holes to the interior of the wall in response to a lower washing liquid level disposed in the tank.

Figure 7:
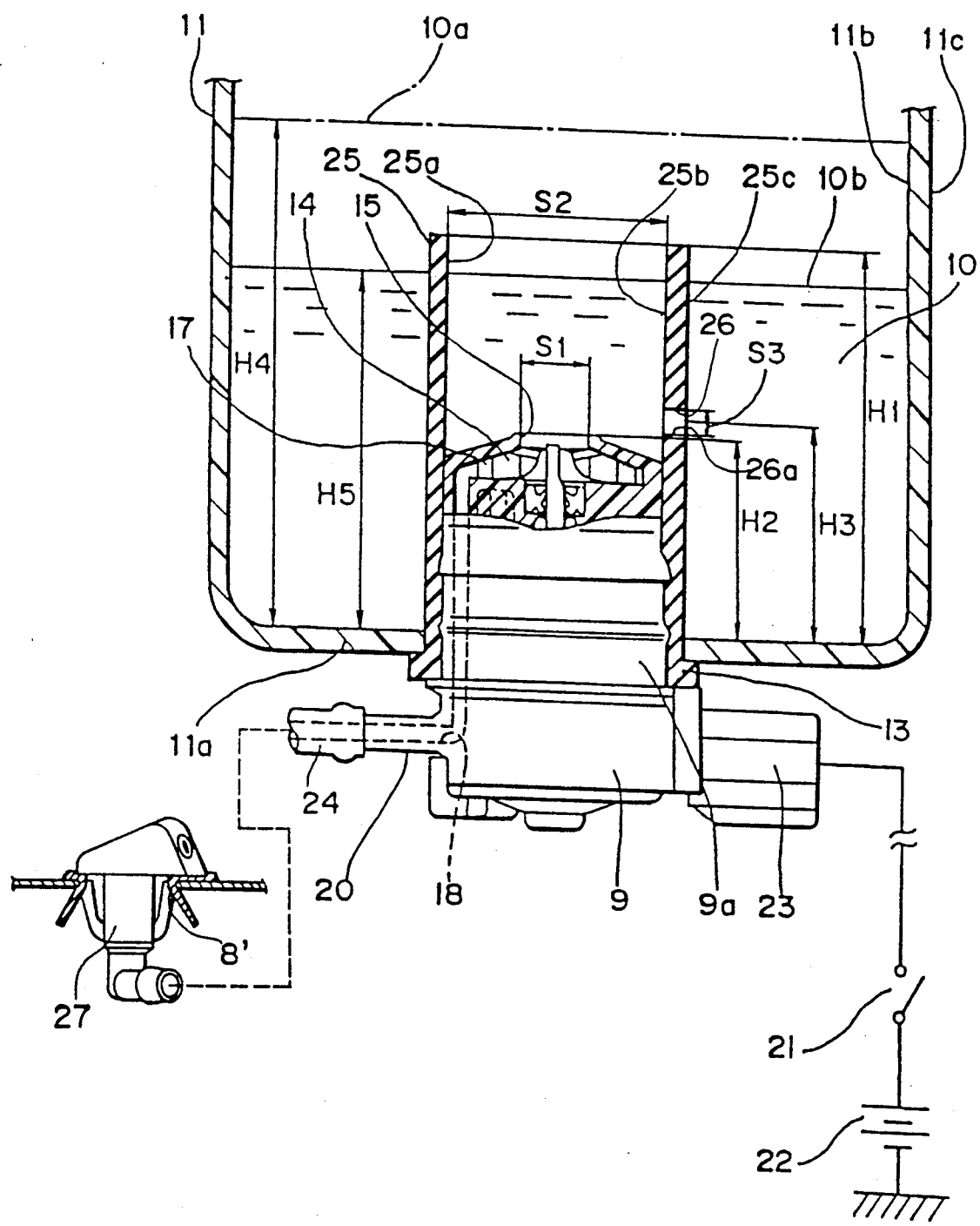
FIG. 7 is a sectional view showing principal portions of a washer pump according to a seventh embodiment of the present invention.

In the seventh embodiment, a washer pump is mounted on said washer tank by means of a mounting member 13 extending upward toward an upper portion of said washer tank 11 so that said mounting member 13 forms said cylindrical peripheral wall 25, shown in FIG. 7.

In addition to the above embodiments, a through-hole or a groove can be appropriately provided as a flow passage between the interior of the tank and that of the cylindrical peripheral wall of the pump provided that a through-hole or a groove satisfies the relationship between the area of the intake portion of the inlet and the area of the cylindrical peripheral wall. For example, the number of through-holes may be plural provided that the sum of the through-holes satisfies the relationship between the area of the intake portion of the inlet and the area of the cylindrical peripheral wall.

It is preferable to form the cylindrical peripheral wall in integration with the peripheral wall of the inlet, but it is possible to connect a cylindrical material with the upper end of the peripheral wall of the inlet with a screw.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A washer pump for sending, to a nozzle under pressure, cleaning liquid introduced into the washer pump from an inlet communicating with an interior of a washer tank and discharged from an outlet of the washer pump comprising:

a pump body that is fixedly mounted on the washer tank so that a portion of the pump body is located on the interior of the washer tank, said pump body including a pump casing that comprises a peripheral wall, said peripheral wall defining the inlet of the pump, said inlet being located in the interior of the washer tank, a cylindrical peripheral wall having an open upper end that defines a first opening, said cylindrical peripheral wall being integral with the pump casing and extending from the peripheral wall of said pump casing that defines the inlet, said cylindrical peripheral wall extending upward toward an upper portion of said washer tank so that said first opening allows communication between the interior of said washer tank and an interior surrounded by said cylindrical peripheral wall; and a second opening formed on said cylindrical peripheral wall, said second opening allowing communication between the interior of said washer tank and the interior surrounded by said cylindrical peripheral wall;

the amount of cleaning liquid which flows from said first and second openings into the interior surrounded by said cylindrical peripheral wall being greater than the amount of cleaning liquid supplied to said inlet when the level of cleaning liquid in said washer tank is higher than the height of said first opening, whereas the amount of cleaning liquid which flows from said first and second openings into the interior surrounded by said cylindrical peripheral wall is smaller than the amount of cleaning liquid supplied to said inlet when the level of cleaning liquid in said washer tank is lower than the height of said first opening.

2. A washer pump according to claim 1, wherein the area of the second opening is less than the area of the inlet of the pump.

3. A washer pump as defined in claim 1, wherein said cylindrical peripheral wall and said pump casing are integral with each other and are fabricated of resin.

4. A washer pump as defined in claim 1, wherein the sum of the area of the first opening and the area of the second opening through which cleaning liquid flows is greater than the area of said inlet when the level of the cleaning liquid in said washer tank is higher than the height of said first opening, whereas the sum of the area of the first opening and the area of the second opening through which cleaning liquid flows is smaller than the area of said inlet when the level of the cleaning liquid in said washer tank is lower than the height of said first opening.

5. A washer pump as defined in claim 4, wherein said second opening consists of a plurality of through-holes allowing communication between the interior of said washer tank and the interior surrounded by said cylindrical peripheral wall.

6. A washer pump as defined in claim 4, wherein said second opening consists of a slit formed from the upper end of said cylindrical peripheral wall toward a lower portion of the cylindrical peripheral wall.

7. A washer pump as defined in claim 1, wherein the quantity of cleaning liquid which flows from said second opening into the interior surrounded by said cylindrical peripheral wall decreases according to a decrease in the level of cleaning liquid in the interior surrounded by said cylindrical peripheral wall.

8. A washer pump as defined in claim 7, wherein said second opening consists of a plurality of through-holes allowing communication between the interior of said washer tank and the interior surrounded by said cylindrical peripheral wall.

9. A washer pump as defined in claim 7, wherein said second opening consists of a slit formed from the upper end of said cylindrical peripheral wall toward a lower portion of said cylindrical peripheral wall.

10. A washer pump as defined in claim 9, wherein said second opening consists of an approximately V-shaped slit formed from the upper end of said cylindrical peripheral wall toward a lower portion of said cylindrical peripheral wall.

11. A washer pump as defined in claim 1, wherein said pump body is mounted on an upstanding side wall of said washer tank and said cylindrical peripheral wall is bent toward an upper portion of said washer tank.

12. A washer pump as defined in claim 11, wherein said second opening is formed on said cylindrical peripheral wall so that said second opening is located below said inlet.

13. A washer pump as defined in claim 1, wherein said pump body includes an impeller for drawing cleaning liquid through the inlet, said impeller being located on the interior of the washer tank.

14. A washer pump according to claim 13, wherein said inlet is positioned adjacent said impeller.

15. A washer pump according to claim 1, wherein said second opening is positioned between the first opening and the inlet of the pump.

16. A washer pump for sending, to a nozzle under pressure, cleaning liquid introduced into the washer pump from an inlet communicating with an interior of a washer tank and discharged from an outlet of the washer pump comprising:

a pump body that is fixedly mounted on the washer tank so that a portion of the pump body is located on the interior of the washer tank, said pump body including a pump casing that comprises a peripheral wall, said peripheral wall defining the inlet of the pump, said inlet being located in the interior of the washer tank, said pump body being mounted on said washer tank by a mounting member that extends toward an upper portion of said washer tank, said mounting member defining a cylindrical peripheral wall having an open upper end that defines a first opening, said cylindrical peripheral wall extending from the peripheral wall of said pump casing that defines the inlet, said cylindrical peripheral wall extending upward toward the upper portion of said washer tank so that said first opening allows communication between the interior of said washer tank and an interior surrounded by said cylindrical peripheral wall; and a second opening formed on said cylindrical peripheral wall, said second opening allowing communication between the interior of said washer tank and the interior surrounded by said cylindrical peripheral wall;

the amount of cleaning liquid which flows from said first and second openings into the interior surrounded by said cylindrical peripheral wall is greater than the amount of cleaning liquid supplied to said inlet when the level of cleaning liquid in said washer tank is higher than the height of said first opening, whereas the amount of cleaning liquid which flows from said first and second openings into the interior surrounded by said cylindrical peripheral wall is smaller than the amount of cleaning liquid supplied to said inlet when the level of cleaning liquid in said washer tank is lower than the height of said first opening.

17. A washer pump as defined in claim 16, wherein the sum of the area of the first opening and the area of the second opening through which cleaning liquid flows is greater than the area of said inlet when the level of the cleaning liquid in said washer tank is higher than the height of said first opening, whereas the sum of the area of the first opening and the area of the second opening through which cleaning liquid flows is smaller than the area of said inlet when the level of the cleaning liquid in said washer tank is lower than the height of said first opening.

18. A washer pump according to claim 16, wherein said second opening is positioned between the first opening and the inlet of the pump.

19. A washer pump according to claim 16, wherein the area of the second opening is less than the area of the inlet of the pump.

20. A washer pump according to claim 16, wherein said mounting member is made of rubber and encircles the peripheral wall.

* * * * *